US012741553B2

(12) United States Patent
Panigrahi et al.

(10) Patent No.: US 12,741,553 B2
(45) Date of Patent: Sep. 22, 2026

(54) SYSTEM AND METHOD FOR CHARGING ELECTRIC VEHICLES

(71) Applicant: Ford Global Technologies, LLC, Dearborn, MI (US)

(72) Inventors: Smruti Panigrahi, Novi, MI (US); Yifan Chen, Ann Arbor, MI (US); Raj Sohmshetty, Canton, MI (US); Kurt Michael Lundeen, Novi, MI (US); Sanghyun Hong, Ann Arbor, MI (US); Sam Hoff, Hazel Park, MI (US); Brian McIntyre, Dexter, MI (US); Hussein Chami, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 824 days.

(21) Appl. No.: 18/177,974

(22) Filed: Mar. 3, 2023

(65) Prior Publication Data

US 2024/0294082 A1 Sep. 5, 2024

(51) Int. Cl.

| | |
|---|---|
| ***H02J 7/00*** | (2026.01) |
| ***B25J 5/02*** | (2006.01) |
| ***B60L 53/14*** | (2019.01) |
| ***B60L 53/35*** | (2019.01) |
| ***B60L 53/62*** | (2019.01) |
| ***B60L 53/66*** | (2019.01) |
| ***B60L 53/67*** | (2019.01) |
| ***B60L 58/12*** | (2019.01) |
| ***H02J 7/50*** | (2026.01) |

(Continued)

(52) U.S. Cl.

CPC ................. *B60L 53/35* (2019.02); *B25J 5/02* (2013.01); *B60L 53/14* (2019.02); *B60L 53/62* (2019.02); *B60L 53/66* (2019.02); *B60L 53/67* (2019.02); *B60L 58/12* (2019.02); *H02J 7/50* (2026.01); *H02J 7/70* (2026.01); *H02J 7/82* (2026.01)

(58) Field of Classification Search

CPC .......... B60L 53/35; B60L 53/14; B60L 53/62; B60L 53/66; B60L 53/67; B60L 58/12; B25J 5/02; H02J 7/0013; H02J 7/0042; H02J 7/0048

USPC ............................................ 320/109; 701/22

See application file for complete search history.

(56) References Cited

U.S. PATENT DOCUMENTS

| | | | | |
|---|---|---|---|---|
| 2014/0354229 A1* | 12/2014 | Zhao | ....................... | B60L 53/68 320/109 |
| 2016/0352113 A1 | 12/2016 | Zhao et al. | | |
| 2020/0139836 A1* | 5/2020 | Sato | ........................ | B60L 53/35 |

(Continued)

FOREIGN PATENT DOCUMENTS

| | | |
|---|---|---|
| KR | 102442678 | 9/2022 |

*Primary Examiner* — Zixuan Zhou
(74) *Attorney, Agent, or Firm* — Burris Law, PLLC

(57) ABSTRACT

A system for charging a plurality of electric vehicles includes a rail structure, a mobile base unit, at least one battery and a controller. The mobile base unit is supported by the rail structure and is configured to move along the rail structure between respective vehicle charging stations. The battery is configured to provide power to the mobile base unit to move along the rail structure. The controller is configured to obtain a charge request from one or more electric vehicles, determine a charging sequence of the electric vehicles based on vehicle parameters and charge parameters of the battery, and move the mobile base unit along the rail structure based on the charging sequence.

19 Claims, 5 Drawing Sheets

(51) Int. Cl.
*H02J 7/70* (2026.01)
*H02J 7/82* (2026.01)

(56) References Cited

U.S. PATENT DOCUMENTS

| | | | | |
|---|---|---|---|---|
| 2020/0144838 | A1* | 5/2020 | Penilla | G01C 21/3484 |
| 2020/0361331 | A1* | 11/2020 | Shin | B60L 53/16 |
| 2023/0145508 | A1 | 5/2023 | Kaphengst et al. | |
| 2023/0191935 | A1* | 6/2023 | Alsalloum | B60L 53/14<br>320/109 |
| 2024/0337697 | A1 | 10/2024 | Hoff et al. | |

* cited by examiner

SYSTEM AND METHOD FOR CHARGING ELECTRIC VEHICLES

FIELD

The present disclosure relates to a system and method for charging electric vehicles.

BACKGROUND

The statements in this section merely provide background information related to the present disclosure and may not constitute prior art.

Various types of automotive vehicles such as battery electric vehicles (BEVs), hybrid electric vehicles (HEVs), plug-in electric vehicles (PHEVs), or fuel cell vehicles, for example, include one or more electric motors that employs electrical energy stored in an energy storage apparatus, such as one or more vehicle batteries, to perform one or more propulsion-based operations. The energy storage apparatus requires periodic charging by connecting the energy storage apparatus to a power source The teachings of the present disclosure address these and other issues with charging the energy storage apparatus of electric vehicles.

SUMMARY

This section provides a general summary of the disclosure and is not a comprehensive disclosure of its full scope or all of its features.

In one form, the present disclosure provides a system for charging a plurality of electric vehicles. The system includes a rail structure, a first mobile base unit, and a central control system. The first mobile base unit is supported by the rail structure and is configured to move along the rail structure between respective vehicle charging stations. The central control system is configured to obtain a charge request from one or more electric vehicles, determine a charging sequence of the electric vehicles based on vehicle parameters and charge parameters of the first battery, and move the first mobile base unit along the rail structure based on the charging sequence.

In variations of the system of the above paragraph, which can be implemented individually or in any combination: the vehicle parameters comprise a current state of charge level and a predetermined state of charge level of each electric vehicle the electric vehicles; the charge parameters comprise a current power level and a predetermined power level of the first battery; the rail structure is an overhead rail structure; a plurality of first batteries configured to provide power to the first mobile base unit to move along the rail structure; a plurality of battery charging stations, one battery charging station disposed at one end of the rail structure and another battery charging station disposed at another end of the rail structure that is opposite the one end, each first battery of the first batteries is configured to be selectively mechanically and electrically coupled to a respective battery charging station of the battery charging stations to charge the first battery; the first mobile base unit comprises at least one battery, a movable base connected to the rail structure and powered by the battery to move along the rail structure between the charging stations, a robot arm having a first end and a second end, the robot arm secured to the movable base at the first end, and an end-effector secured to the robot arm at the second end; the movable base includes an end having a battery terminal configured to be selectively electrically and mechanically coupled to the battery; the at least one battery includes a first battery and a second battery; the movable base includes a first end having a first battery terminal configured to be selectively electrically and mechanically coupled to the first battery and a second end having a second battery terminal configured to be selectively electrically and mechanically coupled to the second battery, the first end of the movable base is opposite the second end of the movable base; the robot arm includes a plurality of segments connected to each other such that the robot arm has multiple degrees of freedom; the movable base is connected to the rail structure by wheels; a plurality of battery charging stations, one battery charging station of the plurality of battery charging stations disposed at one end of the rail structure and another battery charging station of the plurality of battery charging stations disposed at another end of the rail structure that is opposite the one end, the movable base is located between the one battery charging station and the other battery charging station; a second mobile base unit supported by the rail structure and configured to move along the rail structure; and a plurality of second batteries configured to provide power to the second mobile base unit to move along the rail structure.

In another form, the present disclosure provides a system for charging a plurality of electric vehicles. The system includes a rail structure, a plurality of electric charging apparatuses, a first mobile base unit, a plurality of first batteries, and a central control system. The plurality of electric charging apparatuses are disposed at respective vehicle charging stations. The first mobile base unit is supported by the rail structure and is configured to move along the rail structure between the respective vehicle charging stations. The first mobile base unit including a robot arm. The plurality of first batteries are configured to provide power to the first mobile base unit to move along the rail structure. The central control system is configured to obtain a charge request from one or more electric vehicles, determine a charging sequence of the one or more electric vehicles based on vehicle parameters and charge parameters of the first batteries, move the first mobile base unit along the rail structure based on the charging sequence, and control the robot arm to move a charger of a corresponding electric charging apparatus from the corresponding electric charging apparatus to a corresponding electric vehicle located within the respective vehicle charging station associated with the respective electric charging apparatus such that the charger is electrically coupled to the corresponding electric vehicle.

In variations of the system of the above paragraph, which can be implemented individually or in any combination: the vehicle parameters comprise a current state of charge level and a predetermined state of charge level of each electric vehicle the electric vehicles; the charge parameters comprise a current power level and a predetermined power level of the first battery; the rail structure is an overhead rail structure; a plurality of battery charging stations, one battery charging station disposed at one end of the rail structure and another battery charging station disposed at another end of the rail structure that is opposite the one end, each first battery of the first batteries is configured to be selectively mechanically and electrically coupled to a respective battery charging station of the battery charging stations to charge the battery; the first mobile base unit comprises a movable base, the robot arm, and an end-effector, the movable base is connected to the rail structure and powered by a respective first battery to move along the rail structure between the charging stations, the robot arm has a first end and a second end, the robot arm secured to the movable base at the first end, and the end-effector is secured to the robot arm at the second end; a second mobile base unit supported by the rail structure and configured to move along the rail structure; a plurality of second batteries configured to power the second mobile base unit to move along the rail structure; the plurality of vehicle charging stations include first vehicle charging stations and second vehicle charging stations; and the plurality of electric charging apparatuses include first electric charging apparatuses and second electric charging apparatuses, the first electric charging apparatuses disposed at respective first vehicle charging stations and the second electric charging apparatuses disposed at respective second vehicle charging stations, the first mobile base unit movable between the first vehicle charging stations and the second mobile base unit moveable between the second vehicle charging stations.

In another form, the present disclosure provides a method for charging a plurality of electric vehicles. The method includes obtaining a charge request from one or more electric vehicles, determining a charging sequence of the electric vehicles based on vehicle parameters and charge parameters of first batteries, moving a mobile base unit along a rail structure based on the charging sequence, and controlling a robot arm of the mobile base unit to move a charger of a corresponding electric charging apparatus from the corresponding electric charging apparatus to a corresponding electric vehicle of the electric vehicles located at a respective charging station such that the charger is electrically coupled to the corresponding electric vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
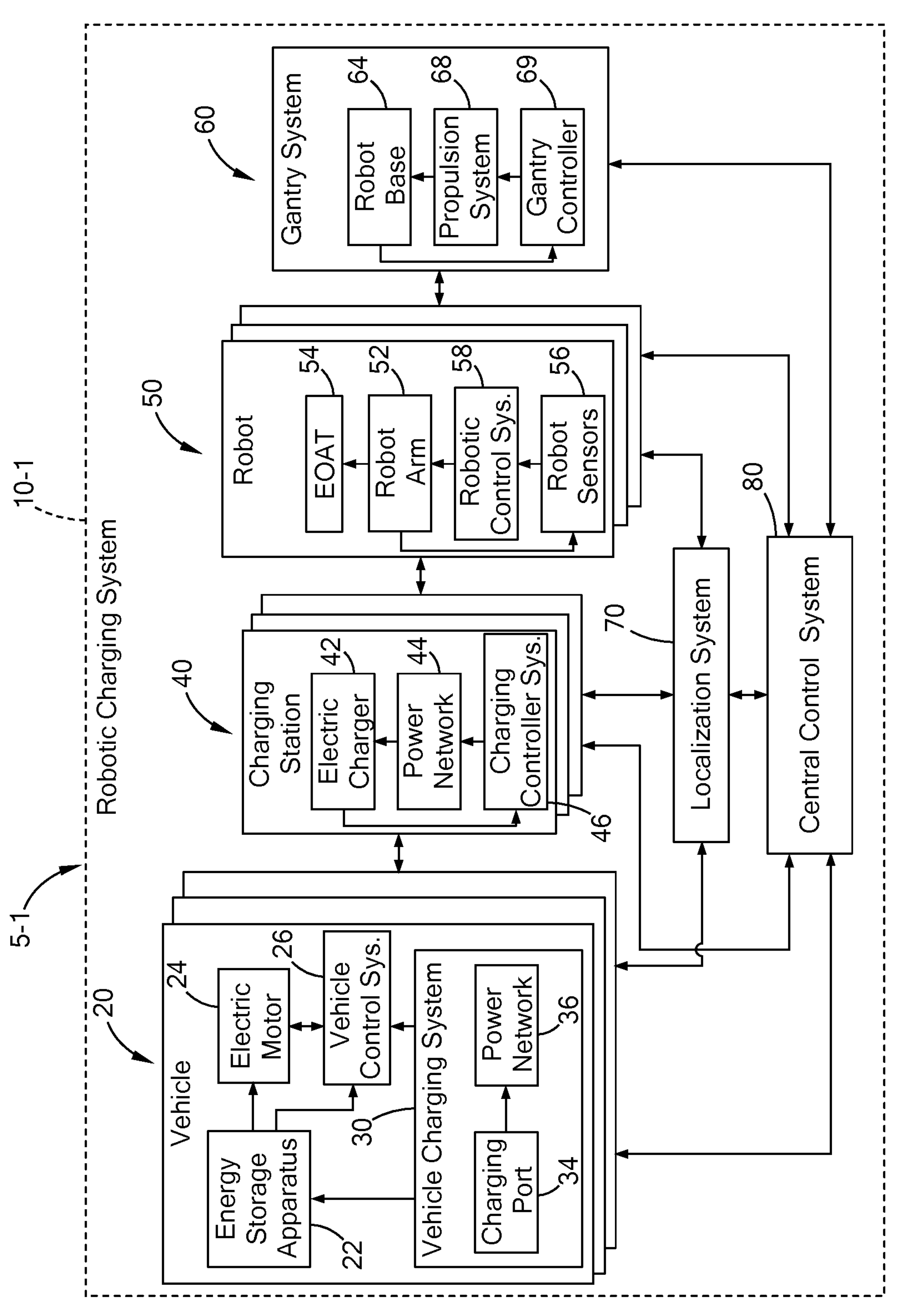
FIG. 1A is a functional block diagram of an example manufacturing environment in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
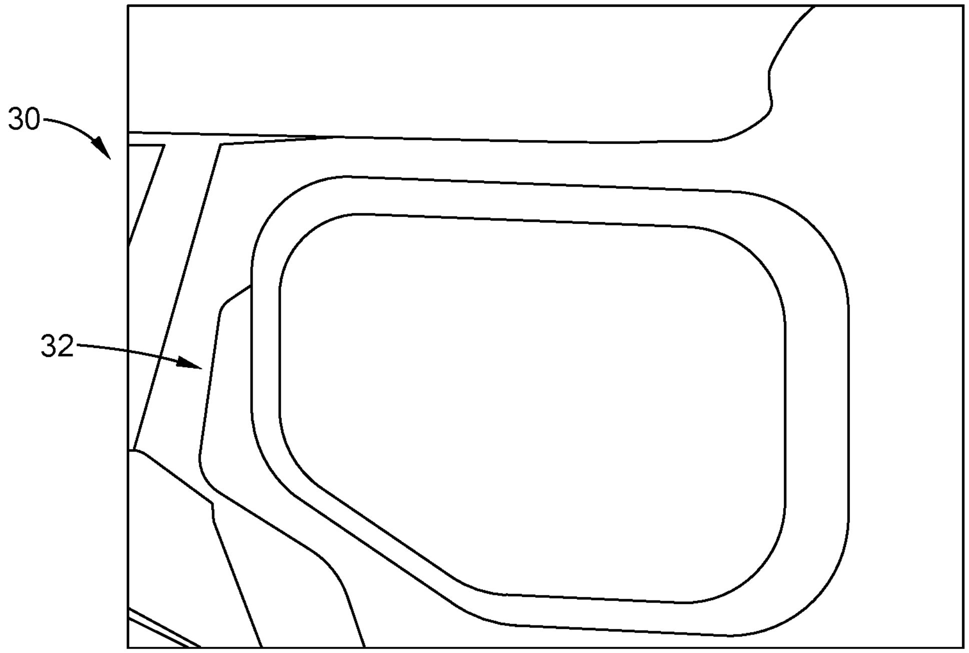
FIG. 1B is a perspective view of an example charging port cover of one electric vehicle in accordance with the teachings of the present disclosure.

Referring to FIGS. 1A and 1B, a manufacturing environment 5-1 is shown and generally includes a robotic charging system 10-1 and a plurality of vehicles 20. In one form, the robotic charging system 10-1 includes a plurality of charging stations 40, a plurality of robots 50, a gantry system 60, a localization system 70, and a central control system 80. It should be understood that any one of the modules of the vehicles 20, the charging stations 40, the robots 50, the gantry system 60, the localization system 70, and the central control system 80 can be provided at the same location or distributed at different locations (e.g., via one or more edge computing devices) and communicably coupled accordingly. In one form, the vehicles 20, the charging stations 40, the robots 50, the gantry system 60, the localization system 70, and the central control system 80 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the vehicles 20 are provided by electric vehicles. As used herein, "electric vehicle" refers to a vehicle that employs one or more electric motors for propulsion. Some examples of electric vehicles are battery electric vehicles (BEVs), hybrid electric vehicles (HEVs), plug-in electric vehicles (PHEVs), or fuel cell vehicles, for example. In one form, the vehicles 20 may be provided by autonomous or semi-autonomous vehicles that are configured to perform one or more known autonomous routines within the manufacturing environment 5-1, such as an autonomous navigation routine, a driver assistance routine, an adaptive cruise control routine, an autonomous braking routine, and/or an object detection routine. It should be understood that the vehicles 20 may be provided by other types of vehicles and are not limited to the examples described herein.

In one form, the vehicles 20 may each include an electric motor 24 that employ electrical energy stored in an energy storage apparatus 22, such as one or more vehicle batteries, to perform one or more propulsion-based operations. In one form, the vehicles 20 include a vehicle control system 26 that is configured to control and/or monitor a particular system or subsystem of the vehicles 20. As an example, the vehicle control system 26 may include a propulsion control module for controlling the operation of the electric motor 24, a powertrain control module for controlling operation of a powertrain system of the vehicle 20, a transmission control module for controlling operation of a transmission system of the vehicle 20, a brake control module for controlling operation of a braking system of the vehicle 20, a body control module for controlling the operation of various electronic accessories in the body of the vehicle 20, a climate control module for controlling operation of a heating and air conditioning system of the vehicle 20, and a suspension control module for controlling operation of a suspension system of the vehicle 20, among other vehicle modules. In one form, the electric motor 24, the energy storage apparatus 22, and the vehicle control system 26 are communicably coupled by a vehicle interface, such as a control system area network (CAN) bus, a local interconnect network (LIN) bus, and/or a clock extension peripheral interface (CXPI) bus.

Figure 1C:
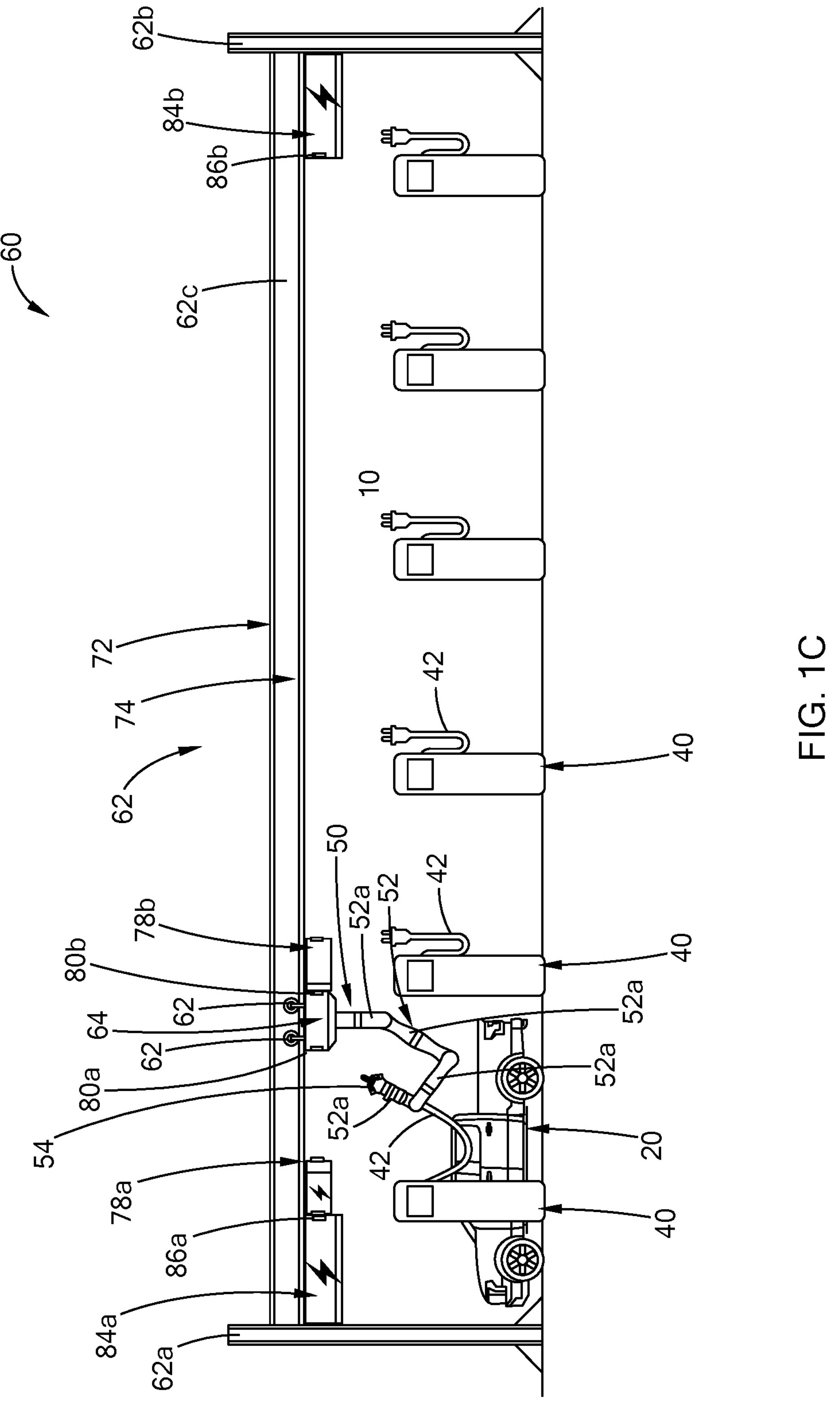
FIG. 1C is a side view of a robotic charging system in accordance with the teachings of the present disclosure.

In one form and referring to FIGS. 1A-1C, the vehicles 20 may each include a vehicle charging system 30 (FIG. 1A) that is configured to receive electrical energy from the charging stations 40. The vehicle charging system 30 may include a charging port cover 32 (FIG. 1B), a charging port 34, and a power network 36. In one form, the charging port cover 32 is movable between a closed position in which the charging port 34 and the power network 36 are inaccessible from a location external to the vehicle 20 (i.e., physically isolated from an ambient environment of the vehicle 20) and an open position in which the charging port 34 and the power network 36 are accessible from a location external to the vehicle 20. In the example illustrated, the charging cover 32 is a door or cap, for example.

In one form, the charging port 34 provides an electrical interface for physically and electrically/inductively coupling an electrical charger of the charging station 40 (described below in further detail) to the power network 36. As an example, the charging port 34 is provided by a charging receptacle (e.g., an electrical outlet) that receives one or more conductive components of the electrical charger of the charging station 40. As another example, the charging port 34 is provided by a charging pad (e.g., a wireless power transfer pad comprising one or more inductive coils) that is configured to inductively and physically couple to a charging pad of the electrical charger.

In one form, the power network 36 selectively adjusts one or more characteristics of the electric signal received from the charging stations 40 and provides the adjusted signal to the energy storage apparatus 22. As an example, the power network 34 includes an alternating current-alternating current (AC-AC) converter circuit that is configured to adjust an amplitude and/or frequency component of an AC electric signal, such as a voltage source inverter, a current source inverter, a cycloconverter, a matrix converter, among other AC-AC converter circuits. As another example, the power network 36 includes an AC-direct current (AC-DC) converter circuit that is configured to convert the AC electric signal into a DC electric signal, such as a rectifier circuit and/or other AC-DC converter circuits. As an additional example, the power network 36 includes a DC-AC converter circuit that is configured to convert the DC electric signal into an AC electric signal, such as an inverter circuit and/or other DC-AC converter circuits. As yet another example, the power network 36 includes a DC-DC converter circuit that is configured to adjust an amplitude of the DC electric signal, such as a buck converter circuit, a boost converter circuit, a buck-boost converter circuit, among other DC-DC converter circuits.

In one form, the charging stations 40 are configured to provide electrical energy to the vehicles 20 during a charging operation and include an electric charger or charging apparatus 42, a power converter network 44, and a charging station control system 46. In one form, the electric charger 42 is electrically coupled to a power grid via the power converter network 44 and may include a conductive cable (e.g., a Level 4 DC fast charger cable, a Level 3 DC charger cable, or a Level 2 AC charger cable) and a charging interface for physically and electrically/inductively coupling to the power network 36 via the charging port 34, such as a plug or a wireless charging pad. In one form, the power converter network 44 is configured to adjust one or more characteristics of the electrical power output by the grid and provide the adjusted electrical power to the energy storage apparatus 22 via the charging port 34 and the power network 36. As an example, the power network 44 may include similar circuits and converter networks as the power network 36, and as such, the description thereof is omitted for brevity.

In one form, each robot 50 includes a robot arm or robotic arm 52, an end of arm tool (EOAT) or end-effector 54, robot sensors 56, and a robot control system 58 configured to control the robotic arm 52 and the EOAT 54 to perform one or more automated tasks. Example automated tasks include, but are not limited to, retrieving the electric charger 42 from the charging station 40 and moving the electric charger 42 proximate to the vehicle 20 (e.g., the charging port 34), removing the charging port cover 32 to insert the electric charger 42 into the charging port 34, among other automated tasks.

In one form, the robotic arm 52 includes a plurality of segments 52*a* (FIG. 1C) connected to each other at joints, thereby allowing the robotic arm 52 to have multiple degrees of freedom. Stated differently, the robotic arm 52 is a multi-axis robotic arm having various portions that are rotatable about various axes (e.g., a six-axis robot having five degrees of freedom). In one form, the EOAT 54 is secured to an end of the robotic arm 52 and includes one or more components for performing the automated tasks described herein, such as an image/vision sensor, a hook, and a gripper. One example of such robotic arm 52 and/or the EOAT 54 are disclosed in U.S. patent application Ser. No. 18/177,954, and titled "ROBOTIC ARM ASSEMBLY FOR ELECTRIC VEHICLE CHARGER," which is commonly owned with the present application and the contents of which are incorporated herein by reference in its entirety.

In one form, the robot sensors 56 generate data corresponding to various characteristics of the robot 50. As an example, the robot sensors 56 may include a location sensor (e.g., an NFC sensor or UWB sensor) configured to generate location information of the robot 50. As another example, the robot sensors 56 may include an accelerometer, a gyroscope, and/or a magnetometer configured to generate orientation information of the robot 50. As yet another example, the robot sensors 56 may include a velocity sensor configured to generate velocity information of the robot 50, a power sensor to generate power information (e.g., information regarding amount of current and/or voltage being applied by a power source to the robot 50), a torque sensor configured to generate torque information of various joints of the robot 50, and/or a touch sensor at a handle of the robot 50 configured to detect contact. The robot sensors 56 are configured to provide the corresponding data to the robot control system 58 for controlling the robotic arm 52 and/or EOAT 54.

In one form, with reference to FIGS. 1A and 1C, the gantry system 60 includes a structural base assembly 62 (FIG. 1C), a plurality of robot bases 64 (FIG. 1A), a plurality of propulsion systems 68 (FIG. 1A), and a gantry control system 69 (1A). The structural base assembly 62 is secured to a ground surface and is configured to physically support the robot base 64. In one example, the structural base assembly 62 is permanently fixed to the ground surface. In another example, the structural base assembly 62 may include wheels that may be movable between a locked position to inhibit movement of the structural base assembly 62 in the manufacturing environment 5-1 and an unlocked position to permit movement of the structural base assembly 62 in the manufacturing environment 5-1. In the example illustrated, the structural base assembly 62 includes support legs 62*a*, 62*b* and a rail structure 62*c*. The support legs 62*a*, 62*b* are spaced apart from each other and extend in a vertical direction. Stated differently, the support leg 62*a* is disposed at a first end of the gantry system 60 and the support leg 62*b* is disposed at a second end of the gantry system 60 that is opposite the first end.

The rail structure 62*c* extends in a horizontal direction and is secured to upper ends of the support legs 62*a*, 62*b*. In this way, the rail structure 62*c* is located above the charging stations 40 and the vehicles 20 located at the charging stations 40. In some forms, the rail structure 62*c* may be secured to the support legs 62*a*, 62*b* at a location that is between the upper ends of the support legs 62*a*, 62*b* and lower ends of the support legs 62*a*, 62*b* (i.e., the lower ends of the support legs 62*a*, 62*b* are secured to the ground surface). In this way, the rail structure 62*c* may be positioned below the charging stations 40, for example. In the example illustrated, the rail structure 62*c* has opposing sides that each define a track 74 (only one side 72 having track 74 is shown in FIG. 1C). In one variation, the support legs 62*a*, 62*b* of the structural base assembly 62 may be omitted such that the structural base assembly 62 includes only the rail structure 62*c*. In such variation, the rail structure 62*c* is secured to a ceiling, wall, or other infrastructure member of the manufacturing environment 5-1.

Each robot base 64 is connected to the rail structure 62*c* and connected to an end of a respective robotic arm 52, and is configured to move along the rail structure 62*c* between the charging stations 40. In this way, the robot 50 can initiate the charging operation at any one of the charging stations 40. In the example illustrated, the robot base 64 is connected to the rail structure 62*c* such that the robot base 64 and the respective robotic arm 52 are suspended therefrom above the ground surface. In some forms, the robot base 64 is mounted on top of the rail structure 62*c* such that the respective robotic arm 52 is suspended from the rail structure 62*c*. In the example illustrated, the robot base 64 is connected to the rail structure 62*c* by wheels 62 received in respective tracks 74. In this way, the wheels 62 roll along the track to move the robot base 64 and the respective robotic arm 52 between the charging stations 40. In some forms, the robot base 64 may be connected to the rail structure 62*c* such that the robot base 64 is slidable along the rail structure 62*c*.

The robot base 64 is powered by a battery 78*a*, 78*b* such as a rechargeable battery, for example. Each robot base 64 includes an electrical terminal 80*a* at a first end of the robot base 64 and an electrical terminal 80*b* at a second end of the robot base 64 that is opposite the first end. Each of the electrical terminals 80*a*, 80*b* provides an electrical interface for physically and electrically/inductively coupling a respective battery 78*a*, 78*b* to the robot base 64. That is, the battery 78*a* is configured to be electrically coupled to the electrical terminal 80*a* to power the robot base 64 and mechanically coupled to the robot base 64 so that the battery 78*a* is supported by the robot base 64. Similarly, the battery 78*b* is configured to be electrically coupled to the electrical terminal 80*b* to power the robot base 64 and mechanically coupled to the robot base 64 so that the battery 78*b* is supported by the robot base 64. A coupling structure (not shown) may be communicably coupled to the central control system 80 and may mechanically lock the battery 78*a*, 78*b* to the robot base 64 such that the battery 78*a*, 78*b* is inhibited from moving relative to the robot base 64 when electrically coupled the respective electrical terminals 80*a*, 80*b*. In some forms, locking assemblies (not shown) may be communicably coupled to the central control system 80 and may be associated along the rail structure 62*c* at respective charging stations 40. In this way, each locking assembly may lock the robot base 64 to the rail structure 62*c* when the robot 50 initiates the charging operating at the respective charging station 40. The batteries 78*a*, 78*b* may be lithium-ion batteries, for example.

In the example illustrated, a battery charging station 84*a* is disposed proximate the support leg 62*a* of the gantry system 60 and is configured to recharge the battery 78*a*. The battery charging station 84*a* is powered by solar panels (not shown) associated with the manufacturing environment 5-1, a swappable battery pack, and/or the power grid. The battery charging station 84*a* may be secured to and supported by one or both of the support leg 62*a* and the rail structure 62*c*. The battery charging station 84*a* includes an electrical terminal 86*a* that faces and is aligned with the electrical terminal 80*a* of the robot base 64. The electrical terminal 86*a* provides an electrical interface for physically and electrically/inductively coupling the battery 78*a* to the battery charging station 84*a*. That is, the battery 78*a* is configured to be electrically coupled to the battery charging station 84*a* to charge the battery 78*a* and mechanically coupled to the battery charging station 84*a* so that the battery 78*a* is supported by the battery charging station 84*a*. A coupling structure (not shown) may be communicably coupled to the central control system 80 and may mechanically lock the battery 78*a* to the battery charging station 84*a* such that the battery 78*a* is inhibited from moving relative to the battery charging station 84*a* when electrically coupled to the battery charging station 84*a*.

A battery charging station 84*b* is disposed proximate the support leg 62*b* of the gantry system 60 and is configured to recharge the battery 78*b*. The battery charging station 84*b* is powered by solar panels (not shown) associated with the manufacturing environment 5-1, a swappable battery pack, and/or the power grid. The battery charging station 84*b* may be secured to and supported by one or both of the support leg 62*b* and the rail structure 62*c*. The battery charging station 84*b* includes an electrical terminal 86*b* that faces and is aligned with the electrical terminal 80*b* of the robot base 64. The electrical terminal 86*b* provides an electrical interface for physically and electrically/inductively coupling the battery 78*b* to the battery charging station 84*b*. That is, the battery 78*b* is configured to be electrically coupled to the battery charging station 84*b* to charge the battery 78*b* and mechanically coupled to the battery charging station 84*b* so that the battery 78*b* is supported by the battery charging station 84*b*. A coupling structure (not shown) may be communicably coupled to the central control system 80 and may mechanically lock the battery 78*b* to the robot base 64 such that the battery 78*b* is inhibited from moving relative to the battery charging station 84*a* when electrically coupled to the battery charging station 84*a*. Each robot base 64 is disposed between the battery charging station 84*a* and the battery charging station 84*b*.

One battery 78*a*, 78*b* is being charged while the other battery 78*a*, 78*b* is providing power to the robot base 64 (and the robot 50). In this way, when the battery 78*a*, 78*b* providing power to the robot base 64 is below a predetermined threshold needed to carry out a charge sequence as described in more detail below, the robot base 64 may swap out batteries such that the robot base 64 can continue the charge sequence. In one form, the robot base 64 may pick-up the charged battery 78*a*, 78*b* before dropping off the depleted battery 78*a*, 78*b*. In some forms, the robot base 64 may drop off the depleted battery 78*a*, 78*b* before picking up the charged battery 78*a*, 78*b*. In this form, an internal battery system of the robot base 64 may power the robot base 64 along the rail structure 62*c* to pick-up the charged battery 78*a*, 78*b*.

In one form, the propulsion system 68 is associated with a respective robot base 64 and includes various known components for moving the robot base 64 and the attached robot 50 along the rail structure 62*c*. As an example, the propulsion system 68 includes drive motors, cable carriers, electrically conductive wires, and other known components that are employed for moving the robot base 64 and the attached robot 50 along the rail structure 62*c*.

In one form, the localization system 70 is configured to localize the robots 50 relative to the vehicles 20 and/or the vehicles 20 relative to the robots 50. That is, the localization system 70 is configured to convert a robot-based position of the robot 50 to a vehicle-based position of the robot 50, a vehicle-based position of the vehicle 20 to a robot-based position of the vehicle 20, or a combination thereof. As an example, the localization system 70 may employ known imaging and fiducial marker systems that employ predefined robot/vehicle location coordinates and translation routines for localizing the robots 50 relative to the vehicles 20 and/or the vehicles 20 relative to the robots 50. As another example, the localization system 70 may employ known object detection systems having predefined robot/vehicle location coordinates and translation routines for localizing the robots 50 relative to the vehicles 20 and/or the vehicles 20 relative to the robots 50, such as a localization structure. Example details regarding localization structures that are employed for localizing the robots 50 relative to the vehicles 20 and/or the vehicles 20 relative to the robots 50 are disclosed in U.S. patent application Ser. No. 18/177,964, and titled "SYSTEM AND METHOD FOR CHARGING ELECTRIC VEHICLES," which is commonly owned with the present application and the contents of which are incorporated herein by reference in its entirety.

In one form, the central control system 80 is configured to control the operation of the robotic charging system 10-1. As an example, the central control system 80 obtains robot data associated with the robots 50, vehicle data associated with the vehicles 20, charging station data associated with the charging stations 40, and battery data associated with the batteries **78*a*, 78*b*. Furthermore, the central control system 80 determines whether one of the vehicles 20 has an amount of electrical energy stored in the corresponding energy storage apparatus 22 that is less than a threshold amount and instructs a selected robot 50 to perform the charging operation. Furthermore, the central control system 80 may determine whether the battery 78*a*, 78*b* powering a selected robot base 64 has enough power to move the robot base 64 along the rail structure 62*c* in accordance with a desired charging sequence and may instruct the selected robot base 64 to swap out the battery 78*a*, 78*b* before moving the robot base 64 along the rail structure in the desired charging sequence. Additional details regarding controlling the operation of the robotic charging system 10-1 are provided below with reference to FIG. 3**.

Figure 2:
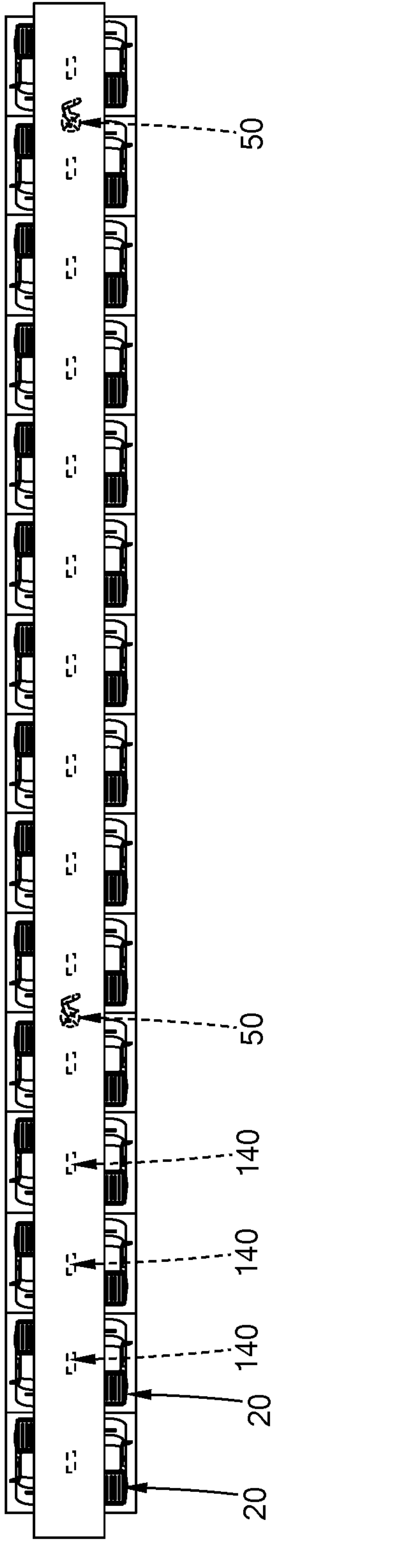
FIG. 2 is a top view of an alternate robotic charging system in accordance with the teachings of the present disclosure.

In one form, the manufacturing environment 5-1 may include a facility or building that is temperature controlled. In another form, the manufacturing environment 5-1 may be outside where the electric vehicles 20 are exposed to ambient temperatures. In one example, as shown in FIG. 2, the manufacturing environment may have a double row layout. In this way, charging stations 140 may have one or more conductive cables that can be moved to the vehicles 20 located in each row by the robots 50 such that the robots 50 can initiate the charging operation of the vehicles 20.

Figure 3:
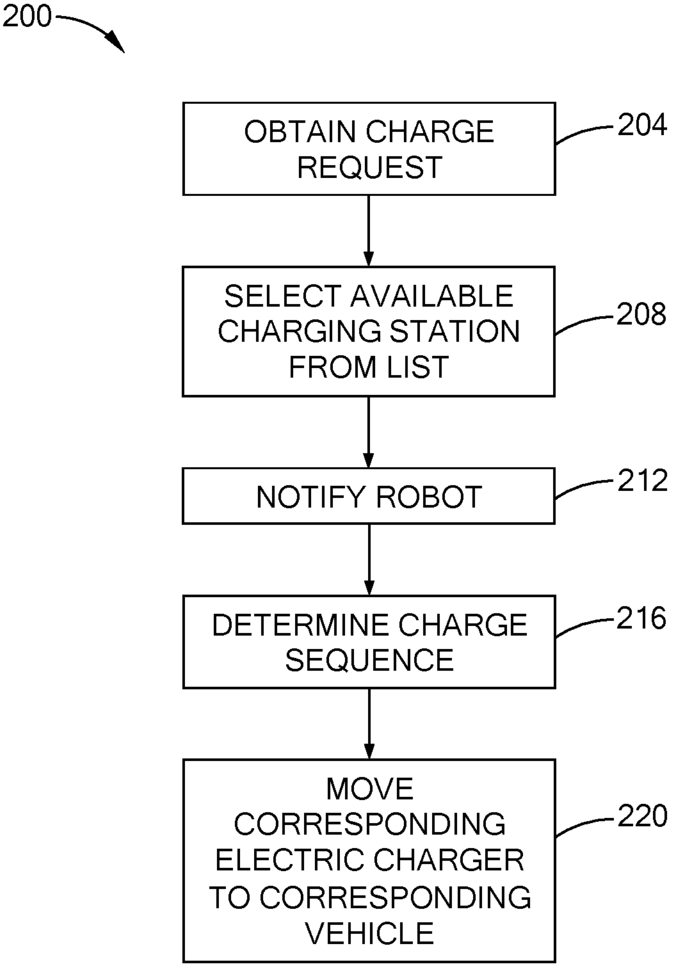
FIG. 3 is a flowchart of an example control routine in accordance with the teachings of the present disclosure.

Referring to FIG. 3, an example control algorithm 200 for charging one or more vehicles 20 is illustrated. The processing may begin once a current state of charge (SOC) level of the energy storage apparatus 22 of one or more vehicles 20 falls below a predetermined threshold SOC level. In one example, the predetermined threshold SOC level may be 60% of a fully charged state. In another example, the predetermined threshold SOC level may be 70% of a fully charged state. At 204, the control algorithm, using the central control system 80, obtains a charge request from one or more vehicles 20 requiring charging. At 208, the control algorithm, using the central control system 80, selects an available charging station 40 from a list of available charging stations 40 for each vehicle 20 requiring charging. The vehicles 20 are then driven to the selected charging stations 40 to be charged. In some forms, the vehicles 20 may be autonomously driven over to the selected charging stations 40.

At 212, the control algorithm, using the central control system 80, notifies the robot 50 that each vehicle 20 requiring charging has arrived at the charging stations 40. Additionally or alternatively, the robot 50 may be notified by the respective vehicle 20 or an image/vision sensor associated with the robot 50 that each vehicle 20 requiring charging has arrived at the charging stations 40. At 216, the control algorithm, using the central control system 80, determines a charging sequence of the vehicles 20 based on vehicle parameters and charge parameters of the batteries **78*a*, 78*b*. That is, the vehicle parameters may include a current SOC level for each vehicle 20 and a predetermined threshold SOC level of each vehicle 20. The charge parameters may include a current power level of each battery 78*a*, 78*b* and a predetermined power level of the batteries 78*a*, 78*b***.

At 220, the control algorithm, using the central control system 80, moves the robot base 64 along the rail structure **62*c* based on the charging sequence and controls the robot arm 52 to move a corresponding electric charger 42 from the charge station 40 to a corresponding vehicle 20 located at the respective vehicle charging station 40 such that the electric charger 42 is electrically coupled to the charge port 34 of the corresponding vehicle 20**.

Knowing the production volume of the vehicles being manufactured, the time it takes for the robot to plug in the electric charger to a vehicle desiring charging, the time it takes for the robot to remove the electric charger from the charged vehicle, the time it takes for the robot to traverse the gantry, and the total charge time for each vehicle, it can be determined the total time the vehicles will be staying in charge stations, the total number of charge stations desired for a given production volume, the total number of robots required for the charge stations, and the length of travel for each robot. In this way, the system of the present disclosure for charging electric vehicles reduces cost for vehicle charging as well as charge station utilization time.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for charging a plurality of electric vehicles, the system comprising:
- a rail structure;
- a first mobile base unit supported by the rail structure and configured to move along the rail structure between respective vehicle charging stations;
- at least one first battery configured to provide power to the first mobile base unit to move the first mobile base unit along the rail structure;
- at least one battery charge station disposed along the rail structure, wherein the at least one first battery is configured to be selectively mechanically and electrically coupled to the at least one battery charge station to charge the at least one first battery; and
- a central control system configured to:
  - obtain a charge request from one or more electric vehicles;
  - determine a charging sequence of the one or more electric vehicles based on vehicle parameters and charge parameters of the at least one first battery; and
  - move the first mobile base unit along the rail structure based on the charging sequence.

2. The system of claim 1, wherein the vehicle parameters comprise a current state of charge level and a predetermined state of charge level of each electric vehicle the one or more electric vehicles, and wherein the charge parameters comprise a current power level and a predetermined power level of the at least one first battery.

3. The system of claim 1, wherein the rail structure is an overhead rail structure.

4. The system of claim 1, wherein the at least one first battery includes a plurality of first batteries configured to provide power to the first mobile base unit to move along the rail structure.

5. The system of claim 4, wherein:
- the at least one battery charge station includes a plurality of battery charging stations, one battery charging station of the plurality of battery charging stations disposed at one end of the rail structure and another battery charging station of the plurality of battery charging stations disposed at another end of the rail structure that is opposite the one end,
- wherein each first battery of the first batteries is configured to be selectively mechanically and electrically coupled to a respective battery charging station of the battery charging stations to charge the first battery.

6. The system of claim 1, wherein the first mobile base unit comprises:
- the at least one first battery;
- a movable base connected to the rail structure and powered by the at least one first battery to move along the rail structure between the charging stations;
- a robot arm having a first end and a second end, the robot arm secured to the movable base at the first end; and
- an end-effector secured to the robot arm at the second end.

7. The system of claim 6, wherein the movable base includes an end having a battery terminal configured to be selectively electrically and mechanically coupled to the at least one first battery.

8. The system of claim 6, wherein:
- the at least one first battery includes a first battery and a second battery; and
- the movable base includes a first end having a first battery terminal configured to be selectively electrically and mechanically coupled to the first battery and a second end having a second battery terminal configured to be selectively electrically and mechanically coupled to the second battery, the first end of the movable base is opposite the second end of the movable base.

9. The system of claim 6, wherein the robot arm includes a plurality of segments connected to each other such that the robot arm has multiple degrees of freedom.

10. The system of claim 6, wherein the movable base is connected to the rail structure by wheels.

11. The system of claim 1, wherein the at least one battery charge station includes a plurality of battery charging stations, one battery charging station of the plurality of battery charging stations disposed at one end of the rail structure and another battery charging station of the plurality of battery charging stations disposed at another end of the rail structure that is opposite the one end, and wherein the movable base is located between the one battery charging station and the another battery charging station.

12. The system of claim 4, further comprising:
- a second mobile base unit supported by the rail structure and configured to move along the rail structure; and
- a plurality of second batteries configured to provide power to the second mobile base unit to move along the rail structure.

13. A system for charging a plurality of electric vehicles, the system comprising:
- a rail structure;
- a plurality of electric charging apparatuses disposed at respective vehicle charging stations;
- a first mobile base unit supported by the rail structure and configured to move along the rail structure between the respective vehicle charging stations, the first mobile base unit including a robot arm;

a plurality of first batteries configured to provide power to the first mobile base unit to move along the rail structure; and a controller configured to:

obtain a charge request from one or more electric vehicles;

determine a charging sequence of the one or more electric vehicles based on vehicle parameters and charge parameters of the first batteries;

move the first mobile base unit along the rail structure based on the charging sequence; and control the robot arm to move a charger of a corresponding electric charging apparatus from the corresponding electric charging apparatus to a corresponding electric vehicle located within the respective vehicle charging station associated with the respective electric charging apparatus such that the charger is electrically coupled to the corresponding electric vehicle.

14. The system of claim 13, wherein the vehicle parameters comprise a current state of charge level and a predetermined state of charge level of each electric vehicle the one or more electric vehicles, and wherein the charge parameters comprise a current power level and a predetermined power level of a respective first battery powering the first mobile base unit.

15. The system of claim 13, wherein the rail structure is an overhead rail structure.

16. The system of claim 13, further comprising:

a plurality of battery charging stations, one battery charging station disposed at one end of the rail structure and another battery charging station disposed at another end of the rail structure that is opposite the one end, wherein each first battery of the first batteries is configured to be selectively mechanically and electrically coupled to a respective battery charging station of the battery charging stations to charge the battery.

17. The system of claim 16, wherein the first mobile base unit comprises:

a movable base connected to the rail structure and powered by a respective first battery to move along the rail structure between the charging stations;

the robot arm having a first end and a second end, the robot arm secured to the movable base at the first end; and an end-effector secured to the robot arm at the second end.

18. The system of claim 13, further comprising:

a second mobile base unit supported by the rail structure and configured to move along the rail structure; and a plurality of second batteries configured to power the second mobile base unit to move along the rail structure.

19. The system of claim 18, wherein:

the plurality of vehicle charging stations include first vehicle charging stations and second vehicle charging stations, and the plurality of electric charging apparatuses include first electric charging apparatuses and second electric charging apparatuses, the first electric charging apparatuses disposed at respective first vehicle charging stations and the second electric charging apparatuses disposed at respective second vehicle charging stations, the first mobile base unit movable between the first vehicle charging stations and the second mobile base unit moveable between the second vehicle charging stations.

* * * * *